United States Patent
Shi et al.

(10) Patent No.: US 12,113,327 B2
(45) Date of Patent: Oct. 8, 2024

(54) LASER AND METHOD FOR GENERATING ELECTROMAGNETIC WAVE SIGNAL HAVING HIGH PHASE COHERENCE

(71) Applicant: JIANGSU NORMAL UNIVERSITY, Jiangsu (CN)

(72) Inventors: Jindan Shi, Suzhou (CN); Xian Feng, Suzhou (CN)

(73) Assignee: JIANGSU NORMAL UNIVERSITY, Jiangsu (CN)

( * ) Notice: Subject to any disclaimer, the term of this patent is extended or adjusted under 35 U.S.C. 154(b) by 0 days.

(21) Appl. No.: 18/560,400

(22) PCT Filed: Jan. 9, 2023

(86) PCT No.: PCT/CN2023/071222
§ 371 (c)(1),
(2) Date: Nov. 13, 2023

(87) PCT Pub. No.: WO2023/142992
PCT Pub. Date: Aug. 3, 2023

(65) Prior Publication Data
US 2024/0250492 A1    Jul. 25, 2024

(30) Foreign Application Priority Data
Jan. 28, 2022   (CN) .................. 202210105981.0

(51) Int. Cl.
*H01S 3/067* (2006.01)
*H01S 3/08* (2023.01)
*H01S 3/094* (2006.01)

(52) U.S. Cl.
CPC ........ *H01S 3/0675* (2013.01); *H01S 3/08086* (2013.01); *H01S 3/094007* (2013.01); *H01S 2302/02* (2013.01)

(58) Field of Classification Search
CPC .............. H01S 3/0675; H01S 3/08086; H01S 3/094007; H01S 2302/02
See application file for complete search history.

(56) References Cited

U.S. PATENT DOCUMENTS

| 2019/0155126 A1 | 5/2019 | Pomeranz et al. |
| 2019/0221986 A1 | 7/2019 | Guo et al. |

FOREIGN PATENT DOCUMENTS

| CN | 101188342 | 5/2008 |
| CN | 101572375 | 11/2009 |

(Continued)

OTHER PUBLICATIONS

Jindan Shi et al., "Triple-wavelength laser from a femtosecond laser directly-written fiber cavity for microwave generation", Optics Letters, Sep. 15, 2022, pp. 4681-4684, vol. 47, No. 19.

(Continued)

*Primary Examiner* — Yuanda Zhang
(74) *Attorney, Agent, or Firm* — JCIPRNET (57) ABSTRACT

A laser and method for generating an electromagnetic wave signal having high phase coherence. A distributed reflective optical fiber laser resonant cavity is formed by a non-polarization-maintaining gain optical fiber and a pair of fiber Bragg gratings of which both ends are written by a femtosecond laser direct-writing and line-etching method. During optical fiber grating writing, a tiny included angle is introduced between the projection of a laser line-etching direction on a horizontal plane where a central axis of an optical fiber core is located and a radial direction of the optical fiber core, and a tiny included angle is introduced between the laser line-etching direction and the horizontal plane where the central axis of the optical fiber core is located. The laser resonant cavity generates a three-wavelength laser output (Continued)

signal and eventually a millimeter wave or terahertz wave is generated between the output signals for outputting.

7 Claims, 4 Drawing Sheets

(56) References Cited

FOREIGN PATENT DOCUMENTS

| | | | | |
|---|---|---|---|---|
| CN | 110829160 | | 2/2020 | |
| CN | 111129923 A | * | 5/2020 | ............. H01S 3/067 |
| CN | 112332203 A | * | 2/2021 | ......... H01S 3/06754 |
| CN | 114447744 | | 5/2022 | |

OTHER PUBLICATIONS

"International Search Report (Form PCT/ISA/210) of PCT/CN2023/071222", mailed on Apr. 24, 2023, with English translation thereof, pp. 1-6.

"Written Opinion of the International Searching Authority (Form PCT/ISA/237) of PCT/CN2023/071222", mailed on Apr. 24, 2023, pp. 1-4.

* cited by examiner

LASER AND METHOD FOR GENERATING ELECTROMAGNETIC WAVE SIGNAL HAVING HIGH PHASE COHERENCE

CROSS-REFERENCE TO RELATED APPLICATION

This application is a 371 of international application of PCT application serial no. PCT/CN2023/071222, filed on Jan. 9, 2023, which claims the priority benefit of China application no. 202210105981.0, filed on Jan. 28, 2022. The entirety of each of the above mentioned patent applications is hereby incorporated by reference herein and made a part of this specification.

TECHNICAL FIELD

The present disclosure belongs to the technical field of laser devices, and specifically relates to a laser device for generating an electromagnetic wave signal having high phase correlation and a method thereof.

BACKGROUND

The millimeter-wave-based 5G technology that has arrived and the terahertz-wave-based 6G technology that has already been studied, enable wireless communication to achieve data speeds that are multiple orders of magnitude faster than the prior art, while data transmission delay time can be shortened by multiple orders of magnitude. However, a mobile network eventually requires to be incorporated into 1.5 μm low-loss optical fiber communication networks, so compared to other technologies, optical fiber based millimeter-wave and the terahertz-wave generators have enormous developmental potential, because optical fiber components can connect the local wireless network to the long distance optical fiber network seamlessly.

Wireless communications require the millimeter-wave and terahertz-wave sources with low phase noise and wide frequency coverage bound. The optical millimeter-wave and terahertz-wave signal sources can be generated by laser differential frequency technique, that is, beat frequency is performed on two laser devices with a certain frequency difference. Two optical waves with different frequencies can be denoted as $E_i(t)=E_{0i}\cdot\cos(\omega_i t+\Phi_i)$ (i=1 or 2), where $E_{0i}$ denotes an amplitude term, $\omega_i$ denotes an angular frequency term, and $\Phi_i$ denotes a phase term of each wave. The components located at millimeter-wave and terahertz-wave generated by the differential frequency technique can be denoted as $A\cdot\cos[(\omega_1-\omega_2)t+(\Phi_1-\Phi_2)]$, where A is an amplitude related to $E_{0i}$. It can be deduced from this that only when the phases of the two waves are highly correlated, that is, the phase difference $\Delta\Phi$ $(=\Phi_1-\Phi_2)$ between the two waves is as small as possible, the millimeter-wave and terahertz-wave signals generated by the differential frequency have high amplitude, frequency and phase stability. Based on this theory, a fiber laser device with dual-wavelength, high linear polarization and single-frequency narrow line width can be adopted. Since the dual-wavelength laser is generated from a same laser cavity, the dual-wavelength laser has a smaller phase difference, which is conducive to the realization of millimeter-wave and terahertz-wave signals with high intensity stability, high frequency stability, and high phase stability.

The previous reported dual-wavelength fiber laser devices include the ones with chirped distributed feedback grating structure, the ones with superimposed dual-wavelength fiber Bragg gratings, or dual-polarization fiber laser devices. The phase difference in the above generated dual-wavelength lasing is not sufficiently low to further reduce the phase noise for obtaining millimeter wave and terahertz wave signals with high intensity stability, high frequency stability and high phase stability. Meanwhile, to broaden the frequency coverage of the millimeter wave and terahertz wave signals, a multiple-wavelength (such as triple-wavelength) fiber laser device is obviously a better solution, however, such an solution requires much higher degree of phase correlation amongst each individual wavelength lasing, and therefore no successful work has been reported so far.

SUMMARY OF INVENTION

In view of the above-mentioned technical deficiencies, the objectives of the present disclosure are to provide a laser device for generating electromagnetic wave signals having high phase correlation and a method thereof, which generates highly linear polarization, single-frequency narrow-linewidth multiple-wavelength lasers. A differential frequency technology that performs a beat frequency between any two of laser output signals implements a multiple-frequency millimeter-wave or a terahertz-wave output with high phase stability. Such a process is simple, low-cost for fabrication, with relatively high mechanical robustness.

In order to solve the above-mentioned technical problems, the technical solutions adopted in the present disclosure are as follows:

The present disclosure provides a method for generating electromagnetic wave signals having high phase correlation, which comprises the following steps:

In S1, a femtosecond laser direct-writing line-etching method for writing fiber Bragg gratings includes as follows:

The fiber Bragg grating is written by the femtosecond laser direct-writing line-writing method at both ends of a non-polarization-maintaining gain fiber.

A femtosecond laser is focused inside a fiber core from a positive upward direction of the non-polarization-maintaining gain fiber through a fiber cladding. A focused laser spot of the femtosecond laser is positioned on a horizontal plane where a central axis of the fiber core is located. The focused laser spot is scanned in horizontal-movement starting from one side of a boundary of the fiber core and the fiber cladding to another side of the boundary of the fiber core and the fiber cladding, across the central axis of the fiber core for line-writing, and a line-type grating planes is formed inside the fiber core.

In particular, a tiny angle is introduced between a projection of a laser line-writing direction on the horizontal plane where the central axis of the fiber core is located and a radial direction of a center of the fiber core, so that a distribution of reflective indices induced by a laser on the line-type grating plane is changed into a trident-shaped refractive index distribution curve of n(r).

Simultaneously, in particular, a tiny angle is introduced between the laser line-writing direction and the horizontal plane where the central axis of the fiber core is located, so that a tiny difference is generated between the refractive indices of small peaks on both sides of the trident-shaped refractive index distribution curve to exhibit in a tiny asymmetry, that is, an asymmetrical trident-shaped refractive index distribution curve of n'(r) is eventually formed.

Secondly, after one line-type grating plane is completed, the focused laser spot is translated in horizontal-movement one period along an axis direction of the fiber core, and the subsequent line-type grating plane is written along a direction that is opposite to a line-writing direction of the previous grating plane.

Eventually, the line-writing is repeated multiple times, and eventually the fiber Bragg grating is written with a preset length.

Since the refractive index distribution curve of the grating plane is in the asymmetrical trident-shaped refractive index distribution curve of n'(r), one set of the fiber Bragg gratings fabricated by one go of a line-writing procedure is equivalent to three sets of fiber Bragg gratings with the same Bragg grating period but with three different effective refractive index.

Furthermore, it is determined by both the preset length of the fiber Bragg grating and the length of a short active fiber that only one narrow-linewidth single longitudinal mode is existed within the spectral linewidth of the fiber gratings.

Furthermore, because the fiber Bragg gratings made by the femtosecond laser line-writing is geometrically asymmetric in two orthogonal directions on the fiber cross-section directions, the eventual fiber Bragg gratings prepared by line-writing has a high birefringence.

In S2, a pair of fiber Bragg gratings are written at both ends of the non-polarization-maintaining gain fiber by means of femtosecond laser direct-writing line-writing to form a distributed reflection fiber laser resonator.

Pump light from a pumping light source is launched into the fiber laser resonator cavity through a first optical fiber wavelength division multiplexer. A laser signal whose laser wavelength is determined by a wavelength of the fiber Bragg grating is oscillated back and forth within the fiber laser resonator for multiple round trips to implement a laser output.

A forward output is formed by the laser output from the fiber laser resonator through a second optical fiber wavelength division multiplexer.

A backward output is formed by the laser output from the fiber laser resonator through the first optical fiber wavelength division multiplexer.

In particular, since one of the pair of fiber Bragg gratings made by femtosecond laser line-writing in Step S1 has the asymmetric trident-shaped refractive index distribution curve of n'(r), the above-mentioned distributed reflection fiber laser resonator formed by such a pair of fiber Bragg gratings is equivalent to a fiber laser resonator containing fiber Bragg gratings with three different wavelengths, and consequently triple-wavelength laser signals are generated.

Meanwhile, in particular, since the fiber Bragg gratings made by femtosecond laser line-writing in Step S1 has a relative large birefringence in two orthogonal directions, the laser signal is oscillated within the fiber laser resonator back and forth for multiple round trips, and the laser signal exhibits a mode competition in the two orthogonal polarization directions, resulting in a significant large polarization extinction ratio, and the output laser signals exhibit extremely high degree of linear polarization.

Eventually, triple-wavelength laser output with high phase correlation, highly linear polarization and single-frequency narrow-linewidth is implemented by the fiber laser resonator that is formed by the line-etched fiber Bragg gratings prepared based on Step S1 according to Step S2 through an all-fiber pumping scheme.

In S3, since the triple-wavelength laser output implemented in Step S3 has highly linear deviation and single-frequency narrow-linewidth, and a high phase correlation is between the laser signals of different wavelengths, multiple-frequency millimeter-wave or terahertz-wave output with high phase stability is implemented through a differential frequency technology that performs a beat frequency between any two of the triple-wavelength laser output signals.

In particular, since the triple-wavelength laser output implemented in Step S3 has highly linear polarization and single-frequency narrow linewidth, and the high phase correlation is between the laser signals of different wavelengths, the multiple-frequency millimeter-wave or the terahertz-wave output with high phase stability implemented through the differential frequency technology that performs the beat frequency between any two of the three-wavelength laser output signals has a fine structure with periodic frequency intervals, and close intensity between sidebands and a principal peak in a frequency domain.

Preferably, the method for writing the fiber Bragg grating is as follows:

The non-polarization-maintaining gain fiber includes the fiber core and the fiber cladding. The femtosecond laser is launched and focused from a positive upward direction of the fiber and is focused on the horizontal plane where the central axis of the optical fiber core is located. The focused laser spot crosses the central axis of the fiber core from a boundary of the fiber core and the fiber cladding along an radial direction of the fiber core for a linear scanning and writes a line-type grating plane structure. In particular, a tiny angle is introduced between the projection of the laser line-writing direction on the horizontal plane where the central axis of the fiber core is located and a radial direction of the center of the crossed fiber core. In particular, a tiny angle is introduced between the laser line-writing direction and the horizontal plane where the central axis of the fiber core is located. After one line-type grating plane is inscribed, the focused laser spot is translated one fiber Bragg grating period along the axis direction of the fiber core, the line-writing and scanning of the subsequent line-type grating plane is repeated, and the process is repeated, until the length of the fiber Bragg grating is reached a preset length.

Preferably, the length of the fiber Bragg grating is between 0.1 cm to 10 cm. The line-writing length of the femtosecond laser in the fiber core ranges from 10% to 100% of the diameter of the optical fiber core. A tiny included angle between the projection of the laser line-writing direction on the horizontal plane where the central axis of the fiber core is located and a radial direction of the fiber core ranges from 1 second to 10 degrees. A tiny angle between the laser line-writing direction and the horizontal plane where the central axis of the fiber core is located ranges from 1 second to 10 degrees.

Preferably, triple-wavelength laser output with high linear polarization degree and single-frequency narrow linewidth is generated under a pumping of a pumping laser. Frequency intervals of the triple-wavelength laser output signals range from 0.1 GHz to 10 THz, and a polarization extinction ratio of the laser signal is greater than 10 dB, and the single-frequency laser signal of 3 dB linewidth is less than 5 kHz.

Preferably, the multiple-frequency millimeter-wave or the terahertz-wave output with high phase stability is implemented through the differential frequency technology that performs the beat frequency between any two of triple-wavelength laser output signals. The frequency of the millimeter-wave or the terahertz-wave generated by the beat frequency is between 0.1 GHz and 10 THz, and 3 dB linewidth of the millimeter-wave or the terahertz-wave of is less than 5 kHz.

Preferably, a triple-frequency millimeter-wave or terahertz-wave signal generated on both sides of a principal peak of the millimeter-wave or the terahertz-wave generated by the beat frequency has a fine structure characteristics of the frequency comb respectively, that is, the highly symmetrical and periodically arranged frequency comb teeth are presented on both sides with the main frequency of the triple-frequency millimeter-wave or terahertz wave signal as the center, and an intensity of the comb teeth is approximate to that of the central peak.

Preferably, an intensity ratio of the first sideband on both sides of the principal peak of the frequency comb of the millimeter-wave or terahertz-wave signal to the principal peak ranges from 0.1% to 10%, and a period of the frequency comb teeth ranges from 1 kHz to 100 MHz.

Another objective of the present disclosure is to provide a laser device for generating electromagnetic wave signals having high phase correlation. The laser device includes a fiber laser resonator, and the fiber laser resonator cavity includes a non-polarization-maintaining gain fiber, and the first optical fiber Bragg grating and the second optical fiber Bragg grating located at both ends of the non-polarization-maintaining gain optical fiber.

The laser device further includes optical fiber wavelength division multiplexers, and the second optical fiber wavelength division multiplexer and the first optical fiber wavelength division multiplexer are respectively arranged on front and rear sides of the optical fiber laser resonator.

The laser device includes a pumping light source, the pumping light source is coupled into one end of the first fiber Bragg grating of the fiber laser resonator through the first optical fiber wavelength division multiplexer, the laser generated in the pumping light source is output through the second optical fiber wavelength division multiplexer to obtain a triple-wavelength laser forward output signal, and is output through the first optical fiber wavelength division multiplexer to obtain a triple-wavelength laser reverse output signal.

The beneficial effects of the present disclosure lie in the following:

1. By introducing two angular quantities as extra freedoms to spatially control the femtosecond-laser fiber-grating direct-writing, over the conventional femtosecond laser direct writing line-writing technology. The written fiber Bragg gratings inside the non-polarization maintaining gain fiber can therefore simultaneously possess the selectivity of multiple frequencies, single longitudinal mode, and high polarization degree.

2. The fiber laser resonator disclosed by the present disclosure can generate multiple wavelength, highly linear polarization and single-frequency narrow-linewidth laser output. Hence, the phase difference amongst the triple-wavelength laser output generated in the same fiber laser cavity is minimized. Furthermore, multiple frequency millimeter-wave or terahertz-wave output with high phase stability can be implemented by the differential frequency technology, through which beat frequency is generated between any two of the triple-wavelength laser output.

3. The laser device disclosed by the present disclosure can implement the all-fiberized structure, has high mechanical robustness, can be fabricated easily, and requires few optical components. The structure of the fiber laser device is largely simplified and the manufacturing cost is low. Therefore, it is conducive to promotion and application.

BRIEF DESCRIPTION OF DRAWINGS

In order to further clearly the embodiments of the present disclosure or the technical solutions in the prior art, the following briefly introduces the accompanying drawings that are required to be used in the descriptions of the embodiments or the prior art. It will be apparent that the accompanying drawings in the following descriptions are merely some embodiments of the present disclosure. For those of ordinary skill in the art, other accompanying drawings can also be obtained according to these accompanying drawings without any creative efforts.

A in FIG. 1 illustrates a vertical view of a fiber Bragg grating prepared by a femtosecond laser direct writing line-writing method in the present disclosure; B in FIG. 1 illustrates a cross section view of the fiber Bragg grating; the grating is actually equivalent to three sets of fiber Bragg gratings with a same Bragg period length but slightly different effective refractive indices.

FIG. 7 illustrates a partial enlarged example diagram of a millimeter-wave signal selected at a frequency of 6.39 GHz in the frequency domain spectrum that is obtained after performing beat frequency in FIG. 6, it can be seen that the millimeter-wave principal peak centered at 6.3925 GHz has an extremely narrow 3 dB linewidth of <500 Hz, meanwhile, since each beat signal has extremely low frequency noise and phase noise, multiple comb teeth are distributed on both sides of the principal peak symmetrically, and the arrangement of the comb teeth shows periodic with a tooth interval of 100 kHz, and the intensity of all sideband comb teeth is relatively strong, by taking the first sideband on either side of the principal peak as an example, the intensity of the sideband is 10% of the intensity of the principal peak.

DESCRIPTION OF REFERENCE NUMBERS

1. Non-polarization-maintaining gain optical fiber; 1a. Fiber cladding; 1b. Fiber core; 2. Focused laser spot; 3. Central axis of fiber core; 4. Horizontal plane where a central axis of a fiber core is located; 5. Line-type grating plane; 6. Laser line-writing direction; 7. Radial direction of fiber core; 8. Tiny angle between a projection of a laser line-writing direction on a horizontal plane where a central axis of a fiber core is located and a radial direction of a fiber core; 9. Tiny angle between a laser line-writing direction and a horizontal plane where a central axis of a fiber core is located; 10. Bragg grating period; 11. The first fiber Bragg grating; 12. The second fiber Bragg grating; 13. Pumping light source; 14. The first optical fiber wavelength division multiplexer; 15. The second optical fiber wavelength division multiplexer; 16. Triple-wavelength laser forward output signal; 17. Triple-wavelength laser backward output signal.

DESCRIPTION OF EMBODIMENTS

The following clearly and completely describes the technical solutions in embodiments of the present disclosure with reference to the accompanying drawings in the embodiments of the present disclosure. It will be apparent that the described embodiments are merely some but not all of the embodiments of the present disclosure. All other embodiments obtained by those of ordinary skill in the art based on the embodiments of the present disclosure without creative effects shall fall within the protection scope of the present disclosure.

In the present disclosure, firstly, a pair of fiber Bragg gratings is written on both ends of a non-polarization-maintaining gain fiber 1 by a femtosecond direct-writing line-writing method to form a distributed Bragg reflection fiber laser resonator, and a length of each fiber Bragg grating is between 0.1 cm and 10 cm. A focused laser spot 2 of the femtosecond laser is located inside a fiber core 1b, and a line-writing length in the fiber core ranges from 10% to 100% of a diameter of the fiber core. A tiny angle 8 between a projection of a laser line-writing direction on a horizontal plane where a central axis of an optical fiber core is located and a radial direction of a fiber core ranges from 1 second to 10 degrees, and a tiny angle 9 between a laser line-writing direction and a horizontal plane where a central axis of a fiber core is located ranges from 1 second to 10 degrees.

Secondly, under a pump of a pump laser, triple-wavelength laser output with high linear polarization degree and single-frequency narrow-linewidth is generated by the distributed Bragg reflection fiber laser resonator. A frequency interval of the triple-wavelength laser output signal range from 0.1 GHz to 10 THz. A polarization extinction ratio (the polarization extinction ratio is defined as a ratio of an output power of the laser output in two orthogonal polarization directions) of the laser signal >10 dB, and a 3 dB linewidth of a single-frequency laser signal is less than 5 kHz.

Thirdly, multiple-frequency millimeter-wave or terahertz-wave output with high phase stability is implemented by a differential frequency technology that performs a beat frequency between any two of the triple-wavelength laser output signals. The millimeter-wave or the terahertz-wave belongs one kind of the electromagnetic waves. The frequency of the millimeter-wave or the terahertz-wave generated by the beat frequency is located between 0.1 GHz and 10 THz, and a 3 dB linewidth of which is less than 5 kHz. On both sides of the principal peak of the millimeter-wave or the terahertz-wave generated by the beat frequency, since the signal generated by the beat frequency itself has high amplitude stability, high frequency stability, and high phase stability, the resulting triple-frequency millimeter-wave or terahertz-wave signals all have the fine structure characteristics of frequency combs, that is, the highly symmetrical and periodically arranged frequency comb teeth are present on both sides with the main frequency of the triple-frequency millimeter-wave or terahertz wave signal as the center, and the intensity of the comb teeth is approximate to the intensity of the central peak, specifically, the intensity ratio of the first sideband on both sides of the principal peak to the principal peak ranges from 0.10% to 10%, and a period of the frequency comb tooth ranges from 1 kHz to 100 MHz.

Embodiment 1

1. A structure of a fiber Bragg grating prepared by a femtosecond laser direct-writing line-writing method.

Figure 1:
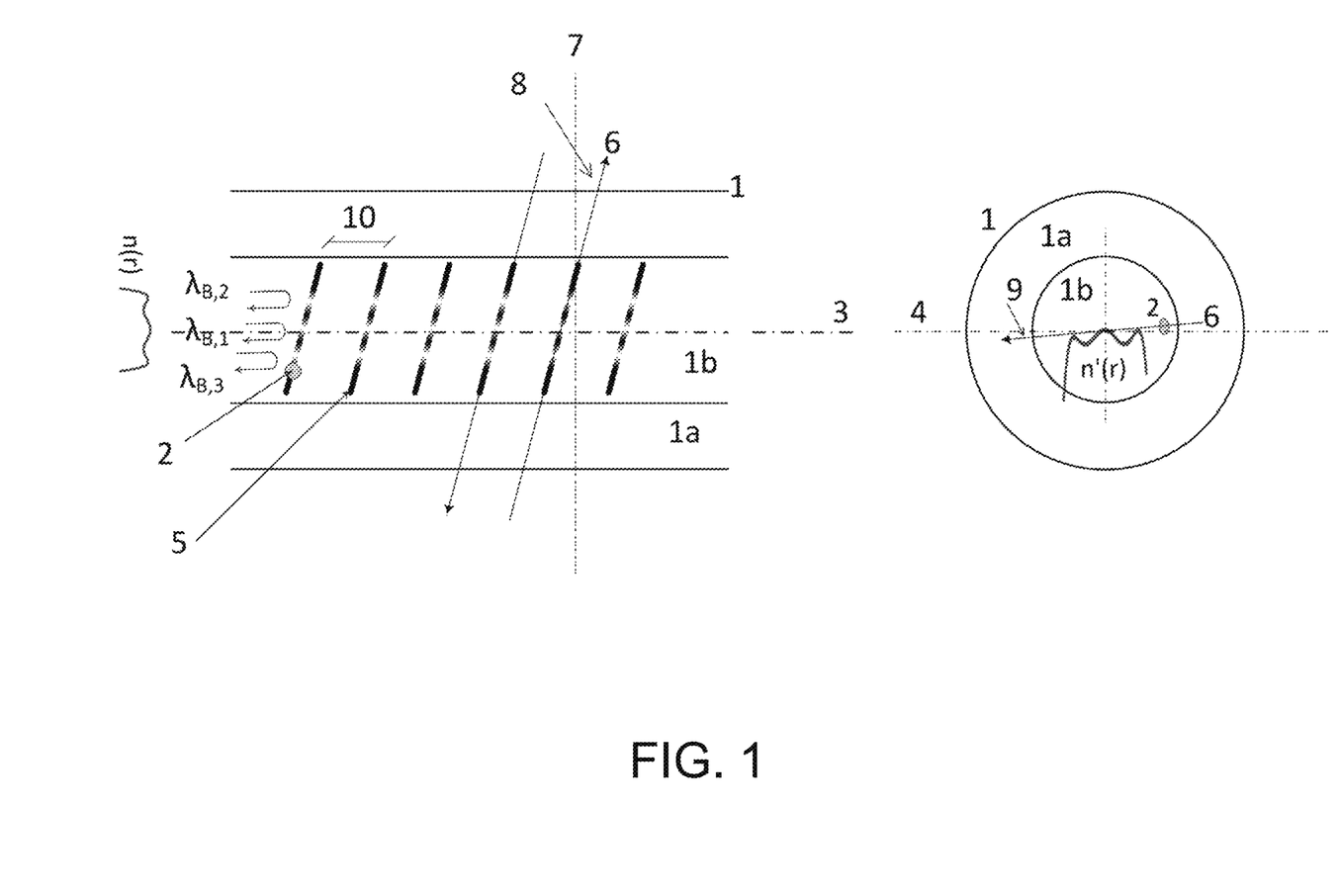

As illustrated in FIG. 1, a light source for writing the uniform fiber Bragg grating is an 800 nm femtosecond laser with a pulse width of 80 femtoseconds, and a repetition rate of 1 kHz, and the non-polarization-maintaining gain fiber 1 is a non-polarization-maintaining erbium-doped silica glass fiber, and the diameter of the fiber core 1b is 4 μm.

The non-polarization-maintaining gain fiber 1 includes the fiber core 1b and a fiber cladding 1a.

The femtosecond laser is focused inside the fiber core 1b from a positive upward direction of the non-polarization-maintaining gain fiber 1 through the fiber cladding 1a. The focused laser spot 2 of the femtosecond laser is positioned on the horizontal plane 4 where the central axis of the optical fiber core is located. The focused laser spot 2 is scanned in horizontal-movement starting from one side of a boundary of the fiber core 1b and the optical fiber cladding 1a to another side of the boundary of the fiber core 1b and the optical fiber cladding 1a, across the central axis 3 of the fiber core for line-writing, and a line-type grating plane 5 is formed inside the fiber core.

A tiny angle 8 between a projection of a laser line-writing direction on a horizontal plane where a central axis of a fiber core is located and a radial direction of a fiber core is slightly adjusted to 1 minute, the distribution of the reflective index induced by the femtosecond laser along the line-writing direction is changed and exhibits a trident-shaped refractive index distribution curve of n(r). At the same time, a tiny included angle 9 between a laser line-writing direction and a horizontal plane where a central axis of an optical fiber core is located is slightly adjusted to 1 minute, so that a tiny difference is generated in the refractive indices of small peaks on both sides of the above-mentioned trident-shaped refractive index distribution curve to exhibit in a tiny asymmetry, that is, an asymmetrical trident-shaped refractive index distribution curve of n'(r) is formed eventually, the line-writing length is 4 microns, which is 100% of the geometric diameter of the fiber core 1b.

After the first line-type grating plane 5 is inscribed, the focused laser spot 2 of the femtosecond laser is translated by 1.1 microns along the central axis 3 of the fiber core, the distance is the designed fiber Bragg grating period 10 made by the femtosecond laser direct-writing line-writing method, Afterwards, the focused laser spot 2 of the femtosecond laser writes the subsequent line-type grating plane 5 along the direction of 180 degrees opposite to the first line-writing direction. In this way, the focused laser spot is programmed to repeat the line-writing movement, until the length of the first fiber Bragg grating 11 and the second fiber Bragg grating 12 reaches the preset values of 6.6 mm and 11 mm, respectively eventually. So that the fiber Bragg grating fabricated by one go of femtosecond direct writing line-writing is actually equivalent to three sets of fiber Bragg gratings with the same Bragg period length but slightly different effective refractive index. In other words, three sets of fiber Bragg gratings with different Bragg wavelengths within the same fiber laser resonator are existed effectively.

Secondly, due to the characteristics of the femtosecond direct-writing line-writing method, the effective refractive index of the guiding transverse mode shows significant discrimination in the orthogonal direction, because of the geometric asymmetry of the formed grating planes in the horizontal and vertical directions of the fiber core. Strong birefringence is introduced into the fiber Bragg grating on the non-polarization-maintaining gain fiber. It enables the grating to have polarization selectivity in addition to the frequency selectivity on the laser output, so that the generated laser signal has an extremely high polarization extinction ratio.

Thirdly, due to the combination of the preset long fiber Bragg grating and the short active fiber length, only one single longitudinal mode with narrow linewidth is allowed to exist within the final spectral linewidth of the fiber gratings.

2. A laser device for generating the millimeter-wave and terahertz-wave signals with high phase correlation.

Figure 2:
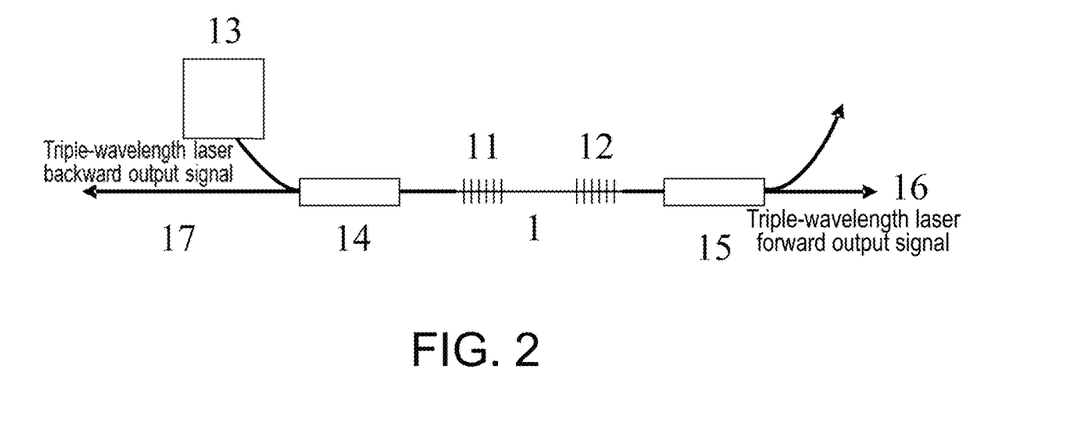
FIG. 2 illustrates a schematic structural diagram of a laser device prepared by applying the operating method for generating millimeter-wave and terahertz-wave signals with high phase correlation in the present disclosure.
Figure 3:
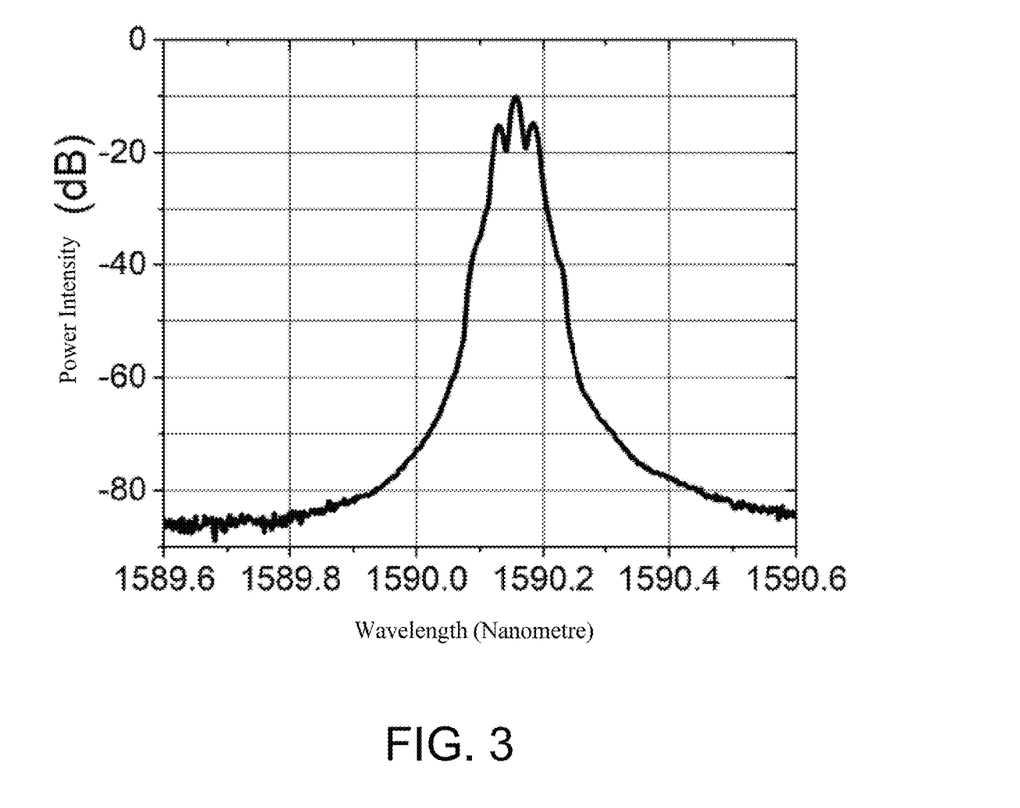
FIG. 3 illustrates a spectrogram obtained by placing the triple-wavelength laser generated in Embodiment 1 into an optical spectrum analyzer; a wavelength interval between the neighboring triple-wavelength laser signals is 0.028 nanometers.
Figure 4:
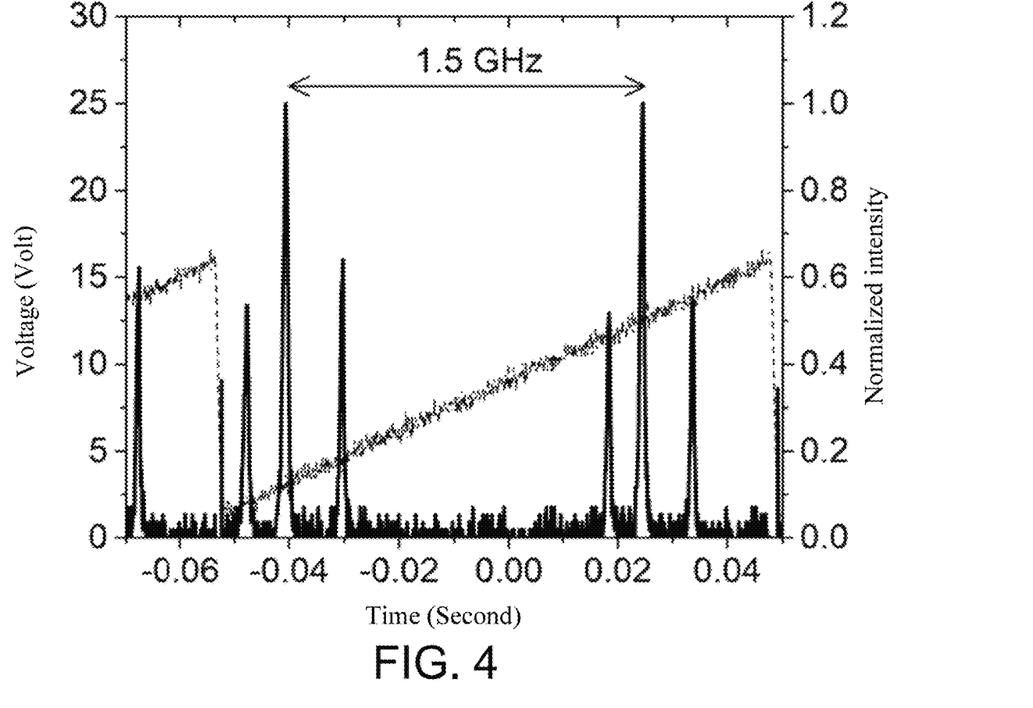
FIG. 4 illustrates an oscilloscope spectrum diagram obtained by placing the triple-wavelength laser generated in Embodiment 1 into a photoelectric probe and a scanning Fabry-Perot interferometer; laser signals at all triple-wavelengths are single longitudinal mode in a free spectral range of 1.5 GHz.
Figure 5:
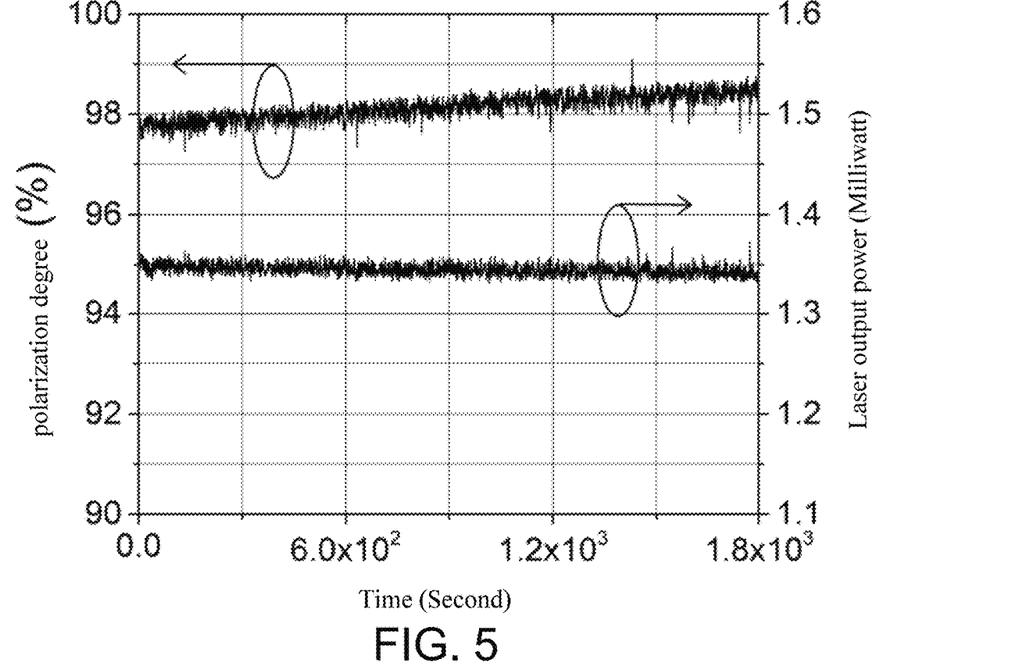
FIG. 5 illustrates an example diagram of a polarization degree of the triple-wavelength laser obtained by placing the triple-wavelength laser generated in Embodiment 1 into a polarimeter, during the half-hour test time, the polarization degree of the triple-wavelength laser output is above 98%, and the root-mean-square deviation less than 0.5%, and the root-mean-square deviation of the laser output power is less than 0.1%.
Figure 6:
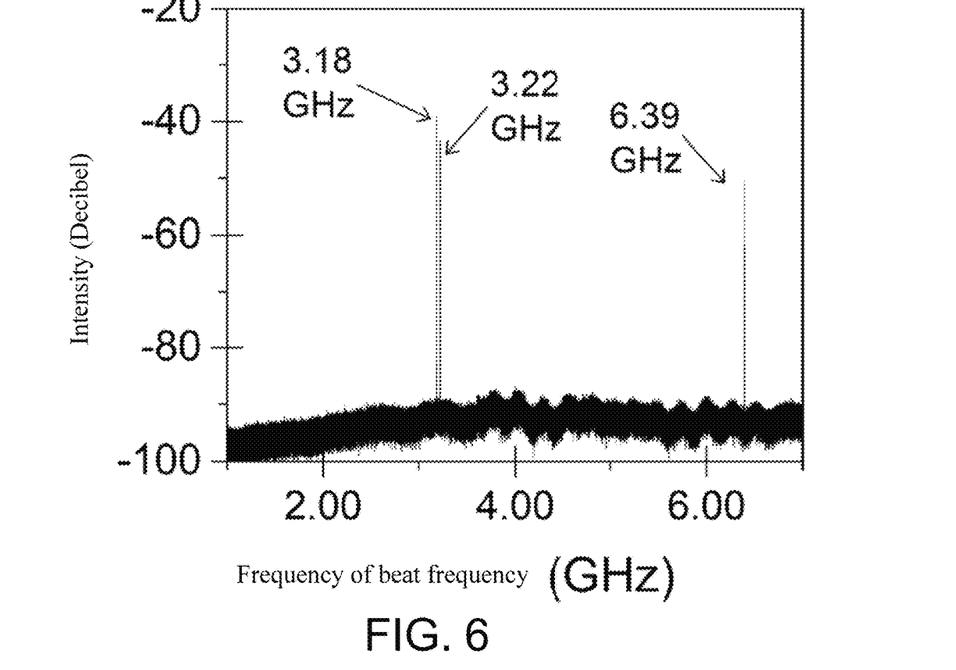
FIG. 6 illustrates an example diagram of the frequency domain spectrum obtained after placing the triple-wavelength laser generated in Embodiment 1 into a photoelectric probe and an electronic frequency analyzer for beat frequency, three stable millimeter-wave frequencies can be seen within a designed frequency range at the frequency of 3.18 GHz, 3.22 GHz and 6.39 GHz, respectively.
Figure 7:
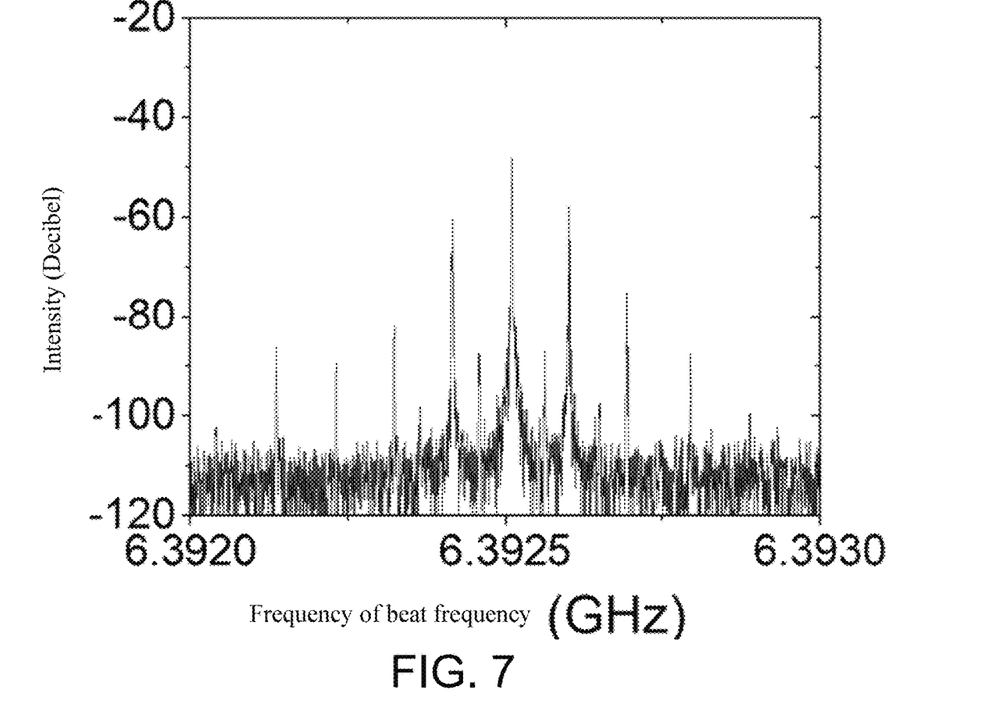

As illustrated in FIG. 2, the laser device is a 1.59-μm all-fiber triple-wavelength linear-polarization single-frequency narrow-linewidth erbium-doped fiber laser device. The fiber laser resonator includes a first fiber Bragg grating 11 with a length of 6.6 mm, and a second fiber Bragg grating 12 with a length of 11 mm, and a non-polarization-maintaining gain fiber 1 with a length of 49 mm. A pigtailed 976-nanometer semiconductor laser with a maximum power of 1 watt is used as the pumping light source 13. The pump light is coupled into one end of the first fiber Bragg grating 11 of the fiber laser resonator through the first optical fiber wavelength division multiplexer 14. The laser generated in the pumping light source 13 is output through the second optical fiber wavelength division multiplexer 15 to obtain the triple-wavelength forward output signal 16, and is output through the first optical fiber wavelength division multiplexer 13a to obtain the triple-wavelength backward output signal 17.

3. Detection and analysis on output signals

The triple-wavelength laser forward output signal 16 or the triple-wavelength laser backward output signal 17 are placed into the instruments and equipment such as the power meter, the spectrum analyzer, the photoelectric detection probe and the electronic frequency analyzer to perform the detection and the analysis on the performances such as power, spectrum, frequency and polarization, and the results of the detection and analysis are as illustrated in FIG. 3 to FIG. 7.

The result data indicate that, in the fiber laser resonator constructed by the non-polarization-maintaining gain fiber 1 and a pair of fiber Bragg gratings on both ends of the non-polarization-maintaining gain fiber 1, highly linear polarized, single-frequency narrow-linewidth triple-wavelength laser output is generated under the pump through the above implementation method. The performance indicators such as sharing the same laser cavity, high degree of linear polarization and single-frequency narrow-linewidth indicate that the triple wavelength laser signal has a very small phase difference, that is, the triple-wavelength laser output are highly phase-correlated.

At last, triple-frequency millimeter-wave or the terahertz-wave output with high phase stability is implemented through the differential frequency technology that performs the beat frequency between any two of the triple-wavelength laser output signals. Since the generated millimeter-wave or terahertz-wave signals self has high amplitude stability, high frequency stability, and high phase stability, the generated triple-frequency millimeter-wave or terahertz-wave signals have the characteristics of a frequency comb, that is, the highly symmetrical and periodically arranged frequency comb teeth are present on both sides with the main frequency of the triple-frequency millimeter-wave or terahertz-wave signal as the center, and the intensity of the comb teeth is approximate to the intensity of the central peak.

The implementation method for generating the millimeter-wave and terahertz-wave signal sources having high phase correlation in the present disclosure has a low manufacturing cost, can be seamlessly connected with the optical fiber network, and is conducive to promotion and application.

It will be apparent that various modifications and variations can be made by those skilled in the art in the present disclosure without departing from the spirit and scope of the present disclosure. Thus, if these modifications and variations of the present disclosure belong to the scopes of the claims of the present disclosure and their equivalents, the present disclosure is also intended to include these modifications and variations.

What is claimed is:

1. A method for generating electromagnetic wave signals having high phase correlation, wherein,
   S1: a femtosecond laser direct-writing line-writing method for writing fiber Bragg gratings including:
   focusing, through a fiber cladding, a femtosecond laser inside a fiber core from a positive upward direction of a non-polarization-maintaining gain fiber; positioning a focused laser spot of the femtosecond laser on a horizontal plane where a central axis of the fiber core is located; scanning in horizontal-movement, the focused laser spot, starting from one side of a boundary of the fiber core and the fiber cladding to another side of the boundary of the fiber core and the fiber cladding, across the central axis of the fiber core for line-writing; and forming a line-type grating plane inside the fiber core;
   introducing a tiny angle between a projection of a laser line-writing direction on the horizontal plane where the central axis of the fiber core is located and a radial direction of the fiber core, thereby changing a distribution of refractive indices induced by a laser on the line-type grating plane into a trident-shaped refractive index distribution curve;
   introducing a tiny angle between the laser line-writing direction and the horizontal plane where the central axis of the fiber core is located, thereby generating a tiny difference between refractive indices of small peaks on both sides of the trident-shaped refractive index distribution curve to exhibit a tiny asymmetry; that is, eventually forming an asymmetric trident-shaped refractive index distribution curve;
   translating in horizontal-movement, after completing one line-type grating plane, the focused laser spot one Bragg grating period along an axis direction of the fiber core; and writing, along a direction that is opposite to a line-writing direction of a previous grating plane, a subsequent line-type grating plane; and
   repeating the line-writing multiple times, and eventually writing the fiber Bragg grating with a preset length;
   S2: writing, by means of femtosecond laser direct-writing line-writing, the fiber Bragg grating on both ends of the non-polarization-maintaining gain fiber to form a distributed fiber laser resonator;
   launching, through a first optical fiber wavelength division multiplexer, pump light from a pumping light source into the distributed fiber laser resonator; and oscillating a laser signal whose laser wavelength is determined by a wavelength of the fiber Bragg grating back and forth within the fiber laser resonator for multiple round trips to implement a laser output;

forming, by the laser output from the fiber laser resonator, a forward output through a second optical fiber wavelength division multiplexer;

forming, by the laser output from the fiber laser resonator, a backward output through the first optical fiber wavelength division multiplexer; and eventually, implementing, by the fiber laser resonator formed by the line-inscribed fiber Bragg grating prepared based on Step S1 according to Step S2, triple-wavelength laser output with high phase correlation, highly linear polarization and single-frequency narrow-linewidth through an all-fiber pumping scheme; and S3: implementing, through a differential frequency technology that performs a beat frequency between any two of triple-wavelength laser output signals, multiple-frequency millimeter-wave or terahertz-wave output with high phase stability, since the triple-wavelength output implemented in Step S2 has highly linear polarization and single-frequency narrow-linewidth and a high phase correlation is between the laser signals of different wavelengths, wherein a fine structure with periodic frequency intervals, and close intensity between sidebands and a principal peak is in a frequency domain.

2. The method for generating the electromagnetic wave signal having high phase correlation according to claim 1, wherein, a length of the fiber Bragg grating is between 0.1 cm and 10 cm, a line-writing length of the femtosecond laser in the fiber core ranges from 10% to 100% of a diameter of the fiber core, the tiny angle between the projection of the laser line-writing direction on the horizontal plane where the central axis of the fiber core is located and the radial direction of the fiber core ranges from 1 second to 10 degrees, and the tiny angle between the laser line-writing direction and the horizontal plane where the central axis of the optical fiber core is located ranges from 1 second to 10 degrees.

3. The method for generating the electromagnetic wave signal having high phase correlation according to claim 2, wherein, the triple-wavelength laser output with highly linear polarization and single-frequency narrow-linewidth is generated under a pumping of a pumping laser, frequency intervals of the triple-wavelength laser output signals range from 0.1 GHz to 10 THz, a polarization extinction ratio of the laser signal is greater than 10 dB, and the single-frequency signal of 3 dB linewidth is less than 5 kHz.

4. The method for generating the electromagnetic wave signal having high phase correlation according to claim 3, wherein, the multiple-frequency millimeter-wave or the terahertz-wave output with high phase stability is implemented through the differential frequency technology that performs the beat frequency between any two of the triple-wavelength laser output signals, the frequency of the millimeter-wave or the terahertz-wave generated by the beat frequency is between 0.1 GHz and 10 THz, and 3 dB linewidth of the millimeter-wave or the terahertz-wave is less than 5 kHz.

5. The method for generating the electromagnetic wave signal having high phase correlation according to claim 4, wherein, a triple-frequency millimeter-wave or terahertz-wave signal generated on both sides of a principal peak of the millimeter-wave or the terahertz-wave generated by the beat frequency has a fine structure characteristic of the frequency comb respectively, that is, highly symmetrical and periodically arranged frequency comb teeth are present on both sides with the main frequency of the triple-frequency millimeter or terahertz wave as the center, and an intensity of the comb teeth is approximate to an intensity of a central peak.

6. The method for generating the electromagnetic wave signal having high phase correlation according to claim 5, wherein, an intensity ratio of a first sideband on both sides of the principal peak to the principal peak ranges from 0.1% to 10%, and a period of the frequency comb teeth ranges from 1 kHz to 100 MHz.

7. A laser device using the method for generating the electromagnetic wave signal having high phase correlation according to claim 1, wherein, comprising the fiber laser resonator, wherein the fiber laser resonator includes the non-polarization-maintaining gain fiber, a first fiber Bragg grating and a second fiber Bragg grating located at both ends of the non-polarization-maintaining gain fiber;

further comprising optical fiber wavelength division multiplexers, wherein the second optical fiber wavelength division multiplexer and the first optical fiber wavelength division multiplexer are respectively arranged on front and rear sides of the fiber laser resonator; and the pumping light source, wherein the pumping light source is coupled into one end of the first fiber Bragg grating of the fiber laser resonator through the first optical fiber wavelength division multiplexer, a laser generated in the pumping light source is output through the second optical fiber wavelength division multiplexer to obtain a triple-wavelength laser forward output signal, and is output through the first optical fiber wavelength division multiplexer to obtain a triple-wavelength laser reverse output signal.

\* \* \* \* \*